US009681477B2

(12) United States Patent
Engelien-Lopes et al.

(10) Patent No.: US 9,681,477 B2
(45) Date of Patent: Jun. 13, 2017

(54) DIGITAL RADIO COMMUNICATION

(71) Applicant: NORDIC SEMICONDUCTOR ASA, Trondheim (NO)

(72) Inventors: David Alexandre Engelien-Lopes, Malvik (NO); Sverre Wichlund, Trondheim (NO); Phil Corbishley, Chilton (GB)

(73) Assignee: NORDIC SEMICONDUCTOR ASA, Trondheim (NO)

( * ) Notice: Subject to any disclaimer, the term of this patent is extended or adjusted under 35 U.S.C. 154(b) by 0 days.

(21) Appl. No.: 14/896,362

(22) PCT Filed: Jun. 4, 2014

(86) PCT No.: PCT/GB2014/051726
§ 371 (c)(1),
(2) Date: Dec. 4, 2015

(87) PCT Pub. No.: WO2014/195703
PCT Pub. Date: Dec. 11, 2014

(65) Prior Publication Data
US 2016/0128117 A1 May 5, 2016

(30) Foreign Application Priority Data

Jun. 5, 2013 (GB) .................................. 1310027.6

(51) Int. Cl.
*H04B 7/00* (2006.01)
*H04W 76/02* (2009.01)
(Continued)

(52) U.S. Cl.
CPC ......... *H04W 76/023* (2013.01); *H04L 5/1438* (2013.01); *H04W 4/008* (2013.01);
(Continued)

(58) Field of Classification Search
CPC ... H04W 76/023; H04W 4/008; H04W 8/005; H04W 76/028; H04W 84/20
(Continued)

(56) References Cited

U.S. PATENT DOCUMENTS 9,036,509 B1 * 5/2015 Addepalli ............. H04W 4/046
370/259
2003/0043930 A1 * 3/2003 Morris .................. H04L 1/0009
375/285
(Continued)

FOREIGN PATENT DOCUMENTS

EP           1179922 A2    2/2002
WO    WO 2013/003753 A2    6/2012

OTHER PUBLICATIONS

Notification of Transmittal of the International Search Report and the Written Opinion of the International Searching Authority (PCT/ISA/220; PCT/ISA/210; PCT/ISA/237) for PCT/GB2014/051726 mailed Aug. 1, 2014.
(Continued)

*Primary Examiner* — April G Gonzales
(74) *Attorney, Agent, or Firm* — Koppel, Patrick, Heybl & Philpott

(57) ABSTRACT

A method of digital radio communication between a first device (2) and a second device (8), where each device comprises a radio transmitter (4, 10) and a radio receiver (6, 12), the method comprising: a) said first and second devices (2, 8) establishing a connection using a predetermined protocol having at least one predefined message format; b) if said connection is subsequently broken, said second device (8) transmitting an advertising message at a first data rate indicating a desire to reconnect; and c) if a reconnection is not established, said second device (8) transmitting a further advertising message at a second data rate indicating
(Continued)

a desire to reconnect, wherein said second data rate is lower than the first data rate.

32 Claims, 4 Drawing Sheets

(51) Int. Cl.
    *H04L 5/14* (2006.01)
    *H04W 4/00* (2009.01)
    *H04W 8/00* (2009.01)
    *H04W 84/20* (2009.01)

(52) U.S. Cl.
    CPC ......... *H04W 8/005* (2013.01); *H04W 76/028* (2013.01); *H04W 84/20* (2013.01)

(58) Field of Classification Search
    USPC ....................................................... 455/41.2
    See application file for complete search history.

(56) References Cited

U.S. PATENT DOCUMENTS

| | | | |
|---|---|---|---|
| 2010/0081381 A1* | 4/2010 | Rofougaran | H04B 7/12 455/41.2 |
| 2010/0083127 A1* | 4/2010 | Rofougaran | H04B 1/406 715/740 |
| 2011/0319020 A1* | 12/2011 | Desai | H04L 63/02 455/41.2 |
| 2012/0258665 A1* | 10/2012 | Sip | H04W 84/18 455/41.2 |
| 2012/0327920 A1* | 12/2012 | Xhafa | H04W 74/0808 370/338 |
| 2013/0010960 A1* | 1/2013 | Ho | H04L 9/0637 380/270 |
| 2013/0094491 A1 | 4/2013 | Sun et al. | |

OTHER PUBLICATIONS

Mikhail Galeev: "A primer on Bluetooth Low Energy (Part 1)" Aug. 8, 2011 (Aug. 8, 2011). pp. 1-3. XP055118824. Retrieved from the Internet: URL:http://www.eetindia.eo.in/STATIC/PDF/201108/ EEIOL_2011AUG08_RFD_TA_01.pdf?SOURCE_S=DOWNLOAD [retrieved on May 20, 2014] the whole document.

UK Intellectual Property Office Search Report for GB1310027.6 dated Dec. 2, 2013.

International Preliminary Report on Patentability and Written Opinion from Appl. No. PCT/GB2014/051726, dated Dec. 8, 2015.

* cited by examiner

DIGITAL RADIO COMMUNICATION

This application relates to short range radio communication. It relates particularly, although not exclusively, to ad hoc short range radio communication protocols such as Bluetooth™, or the more recent Bluetooth Low Energy™ protocol.

The Bluetooth Low Energy (BLE) core specification version 4.0 specifies a fixed data rate of 1 MBps as well as a maximum transmitter output power of 10 mW and a minimum receiver sensitivity of −70 dB at a bit error rate (BER) of 0.1%. The combined effect of these is that there is a maximum effective range between which BLE-enabled devices can communicate. The actual range which can be achieved is dependent on environmental factors such as noise and obstacles but may be of the order of 10-100 metres.

When viewed from a first aspect the invention provides a method of digital radio communication between a first device and a second device, each comprising a radio transmitter and a radio receiver, the method comprising:

a) said first and second devices establishing a connection using a predetermined protocol having at least one predefined message format;

b) if said connection is subsequently broken, said second device transmitting an advertising message at a first data rate indicating a desire to reconnect; and c) if a reconnection is not established, said second device transmitting a further advertising message at a second data rate indicating a desire to reconnect, wherein said second data rate is lower than the first data rate.

The invention extends to a digital radio communication system comprising a first device and a second device, each comprising a radio transmitter and a radio receiver, wherein:

a) said first and second devices are arranged to establish a connection using a predetermined protocol having at least one predefined message format;

b) if said connection is subsequently broken, said second device is arranged to transmit an advertising message at a first data rate indicating a desire to reconnect; and c) if a reconnection is not established, said second device is arranged to transmit a further advertising message at a second data rate indicating a desire to reconnect, wherein said second data rate is lower than the first data rate.

The invention further extends to a digital radio device comprising a radio transmitter and a radio receiver, the device being arranged:

a) to establish a connection with another device using a predetermined protocol having at least one predefined message format;

b) if said connection is subsequently broken, to transmit an advertising message at a first data rate indicating a desire to reconnect; and c) if a reconnection is not established, to transmit a further advertising message at a second data rate indicating a desire to reconnect, wherein said second data rate is lower than the first data rate.

Thus it will be seen by those skilled in the art that in accordance with the invention two devices may be able to establish a reconnection after an initial connection has been broken by using a lower data rate if reconnection cannot be achieved at a higher data rate. It will be appreciated that by using a lower data rate, reception of messages over a greater distance can be achieved. Embodiments of the invention may therefore allow reconnection between devices at a greater distance than would otherwise be the case.

Although an improvement in range may be achieved simply from transmitting at a lower rate (e.g. by using narrower filters), in a set of embodiments the lower data rate results from at least part of said further advertising message being encoded using a coding scheme in which at least some bits specified in said predefined message format are represented by a plurality of bits transmitted. The advantage of this is that it is easier to recover the represented bit even if some of the actual bits transmitted are not received or recovered reliably. This means that a BER specified in the protocol can be achieved for represented bits whilst the error rate for transmitted bits (referred to hereinafter as "chips")—i.e. the Chip Error Rate is much higher. In practical terms this means that for a given transmission power and a given receiver, a reconnection that is otherwise in accordance with the protocol may be achieved over a greater distance than without the coding scheme being applied. Such operation can therefore be considered part of a long range mode of the protocol. Moreover by applying a higher data rate first, the long range mode (with a lower data rate) is only employed if it is required—i.e. if a reconnection cannot be established at the higher data rate.

In the context of Bluetooth Low Energy, the arrangements described above represent an extension to the core specification which support the introduction of a long range mode. This has the potential to extend the usefulness of BLE. The advertising message may therefore comprise one or more Advertising packets or one or more Advertising events in accordance with the Bluetooth Low Energy specification.

As will be appreciated by those skilled in the art representing each data bit by a plurality of chips reduces the effective data rate which can be achieved. More specifically where each data bit is represented by a fixed length sequence, the effective data rate is the chip rate divided by the sequence length. There is thus a trade-off between sequence length and data rate. On the other hand the longer the sequence used, the greater the range which can be achieved for a given data BER as longer sequences give greater tolerance to dropped chips, In a set of embodiments the first device comprises a master device and the second device comprises a slave device.

Where employed, the coding scheme could take one of a number of different forms. In a set of embodiments it may, for example, comprise simply repeating each bit in a message or part of a message a predetermined number of times. It may comprise repeating a string forming part of a message a predetermined number of times. In a set of preferred embodiments a respective fixed sequence of chips is used to represent each data bit, which may be known as direct sequence spread spectrum (DSSS) coding. Any combination of the above approaches (and others) could also be used.

In set of embodiments the first and second devices agree during a connection that the second device will operate in accordance with the invention to establish the reconnection. Such agreement may, for example, be predicated on the first and second devices both supporting the lower data rate. However pre-agreement is not essential and the second device could simply attempt to send the advertising message at the lower data rate in case it is supported by the first device.

The second device may transmit only one advertising message at the first data rate, but more typically it will transmit a plurality. For example the advertising message could form part of one or more Advertising events.

In a set of embodiments if a reconnection is not established at said second data rate, said second device may transmit a further advertising message at the first data rate indicating a desire to reconnect. This allows the second device to retry the first rate in case conditions have improved or another device is available to connect.

The second device may support more than two data rates for advertisement messages. Thus in a set of embodiments the method comprises d) if a reconnection is not established at said second data rate, said second device transmitting a further advertising message at a third data rate indicating a desire to reconnect, wherein said third data rate is lower than the second data rate. The procedure may be continued using yet further, lower, data rates. Once the second device has transmitted at its lowest data rate for advertisement messages it may revert to the first data rate as described above. Hence in a set of embodiments the second device cycles through its available data rates for advertisement messages. Such cycling may allow the second device to connect to other devices than the first it was previously connected to if that first device is no longer available.

Where the second device supports more than two data rates for advertisement messages it may be arranged to use each of the data rates it supports, if necessary, to establish a reconnection. This allows the procedures described herein to be used between devices which do not necessarily have knowledge of each other's capabilities. Alternatively the second device may have knowledge of the capabilities of the first device. For example it may previously have undergone a Bonding procedure with the first device as defined in the Bluetooth Low Energy core specification v4.0. In this case, where the first device supports only a subset of the data rates supported by the second device for advertisement messages, the second device may restrict the data rates it uses to those supported by the first device.

The first device is preferably arranged to listen for messages at both said first and second data rates. This allows a reconnection to be established at the first data rate if possible, but if not it may then receive the advertisement message at the second data rate, giving a better chance of reconnection.

The first device may support more than two data rates for advertisement messages. Where the first device supports more than two data rates it may be arranged to listen at each of the data rates it supports, if necessary, to establish a reconnection. For example the first device may cycle through the possible data rates at least for advertisement messages. This may be in addition to cycling through a plurality of possible advertising channels. Such an approach allows the procedures described herein to be used between devices which do not necessarily have knowledge of each other's capabilities. Alternatively the first device may have knowledge of the capabilities of the second device. For example as mentioned above it may previously have undergone a Bonding procedure with the second device as defined in the Bluetooth Low Energy core specification v4.0. In this case, where the second device supports only a subset of the data rates for advertisement messages supported by the first device, the first device may restrict the data rates it listens at to those supported by the second device.

Once a reconnection is established subsequent communication could take place at a different data rate, for example a standard data rate. In a set of embodiments however subsequent communication takes place at the data rate applied to the advertisement message received by the second device in order to establish the reconnection—e.g. the first data rate, second data rate or a third data rate etc. This provides a very simple way of selecting an appropriate data rate for allowing data to be exchanged successfully for the present circumstances (e.g. separation of the devices).

The data rate selected for subsequent communication after the reconnection has been established may be used for all subsequent communication between the first and second device for the duration of the reconnection. In a set of preferred embodiments however the data rate can be changed if a criterion is met. The data rate may be changed by simply discontinuing the application of any coding scheme or by applying a different coding scheme—e.g. one with a different coding gain.

The criterion used to determine whether to change the applied data rate during a connection could comprise a measure of the quality of signal between the two devices. This might include, for example, a threshold bit error rate or estimate of noise or interference. Alternatively it could comprise an estimate of the separation of the devices. In a set of preferred embodiments the criterion comprises an estimate of the received signal strength from the other device. Thus in a set of embodiments the data rate is changed if the received signal strength of one device is determined to be above or below a threshold level. The first and second devices may each be arranged to determine the signal strength received from the other to determine whether to change the predetermined coding scheme; or only one of them may be arranged to do this—e.g. the first device.

Arrangements set out above may allow, for example, a reduced coding gain (and so an increased data rate) to be applied if the received signal strength is high and vice versa.

In a set of embodiments the predetermined protocol is compatible with the Bluetooth™ protocol as issued by the Bluetooth Special Interest Group, e.g. as defined in the Bluetooth Low Energy core specification v4.0. For example the protocol may be a modification of the Bluetooth Low Energy core specification v4.0 to accommodate, inter alia, the features described herein. Thus in embodiments the second device enters the Advertising state defined in the Bluetooth core specification v4.0 and the first device enters the Scanning state defined in the Bluetooth core specification v4.0.

Certain embodiments of the invention will now be described, by way of example only, with reference to the accompanying drawings in which.

Figure 1:
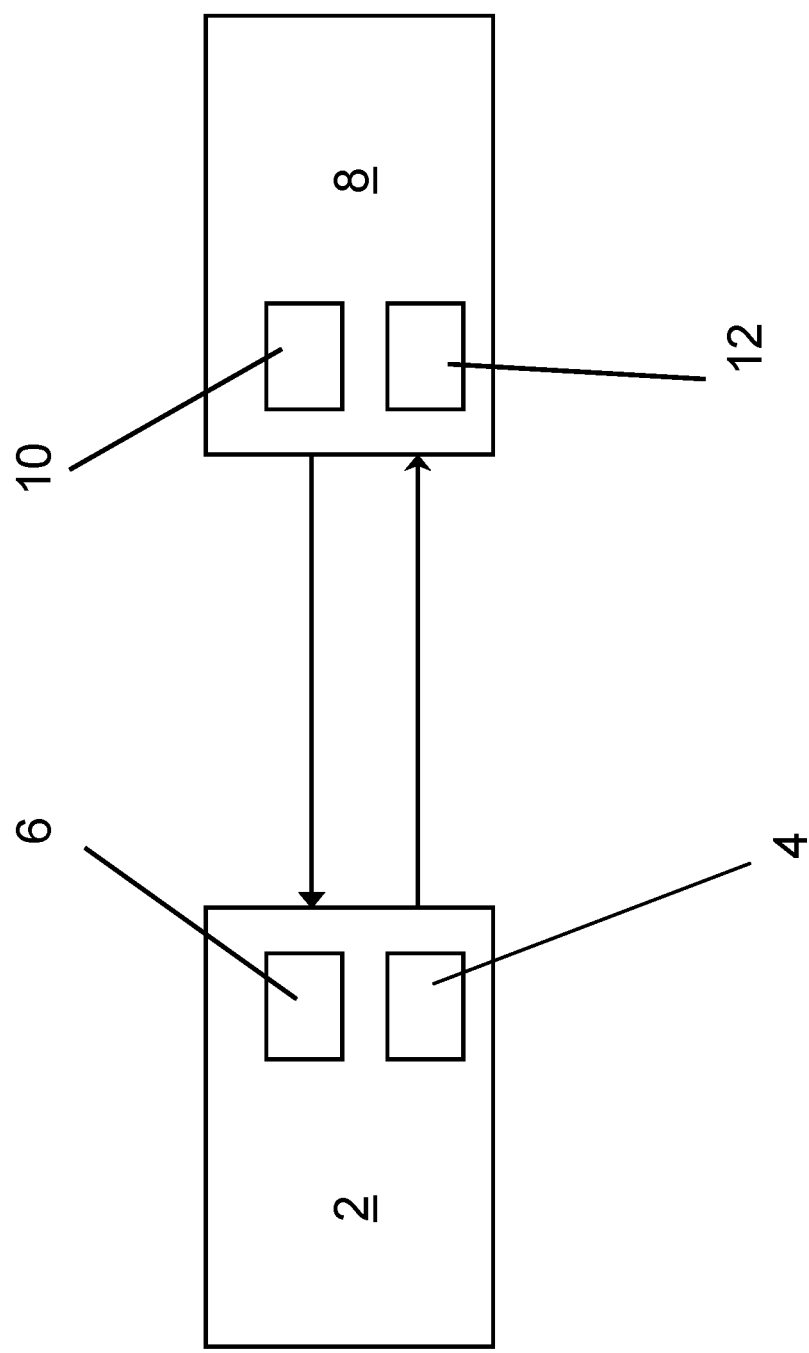
FIG. 1 is a generalised illustration showing a first and second device communicating with one another.

FIG. 1 shows a master device 2 (also known as a Central device) having a radio transmitter section 4 and a radio receiver section 6; and a slave device 8 (also known as a Peripheral device) also having a radio transmitter section 10 and a radio receiver section 12. Apart from where specified to the contrary hereinbelow the Master and Slave devices 2, 8 are configured to operate according to the Bluetooth Low Energy (BTLE) core specification version 4.0.

Figure 2:
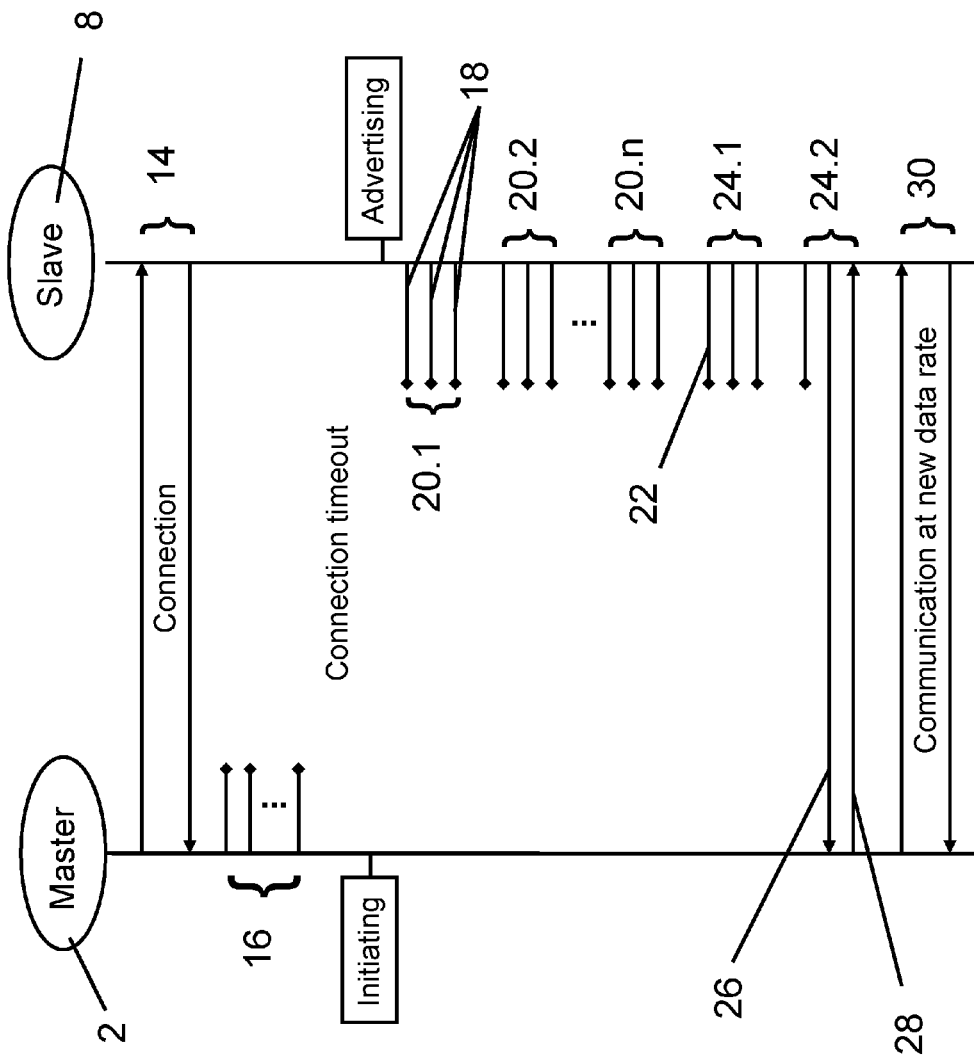
FIG. 2 is a schematic illustration of the procedure followed by the devices in accordance with an embodiment of the invention.

FIG. 2 illustrates operation of an embodiment described herein. The operation which will be described here assumes that the master 2 and slave 8 have a connection 14 established at the standard Bluetooth 1 MBps data rate. This could be a simple Pairing connection or it might have been established as part of a Bonding procedure.

At some later time the master 2 sends a number of standard polling packets 16 but these do not reach the slave device 8 and so the slave does not send an acknowledgement. After a predefined number of unacknowledged packets 16 have been transmitted (the number being defined in the Bluetooth specification), the master device 2 declares a timeout and enters the Standby state.

Similarly the slave device 8 recognises a communication timeout after failing to receive the expected polling packets 16 from the master and also enters the Standby state. After a period of being in the Standby state the master device 2 enters the Initiating state in which it is listening for Advertisement packets from the slave device 8.

The slave device 8 enters the corresponding Advertising state in which it periodically transmits Advertising packets 18. It does this by transmitting the Advertisement packets in groups of three which together constitute an Advertising event. Thus it may be seen in FIG. 2 that in the first Advertising event 20.1 three Advertisement packets 18 are transmitted. At this stage the Advertisement packets 18 are transmitted at the standard 1 MBps data rate. Assuming that the devices are still too far apart to support a standard connection, these packets 18 are not received. As none of the packets 18 from the first Advertising event 20.1 is received and acknowledged, the slave device 8 starts another Advertising event 20.2 after a predefined time.

During this time the master device 2 listens on all the available advertising channels and all available data rates, cycling through them in turn.

This continues until the nth Advertising event 20.*n*. If this, too does not result in any Advertisement packets 18 being received and acknowledged the slave device 8 switches to a lower data rate by applying a coding scheme to most of the Advertising packet 22. As will be explained below in more detail with reference to FIG. 4, this entails transmitting a plurality of 'chips' to represent each bit of the packet data being encoded. This enables successful receipt of packets over a much longer distance since the intended bit can be recovered even if one or some of the individual chips is not successfully received. The number of chips representing each bit is referred to herein as the sequence length or the coding gain. The slave device 8 thus initiates a new Advertising event 24.1 at the lower data rate.

FIG. 2 shows none of the Advertisement packets 22 from the first Advertising event at the lower data rate 24.1 being received but in this example the second packet 26 of the group of three from the second Advertising event at the lower data rate 24.2 is received by the master 2. This coincides with the master 2 listening at the lower data rate on the advertising channel used by the slave 8. To listen at the lower data rate the demodulator used by the master 2 is configured to decode the coding scheme applied to achieve the lower data rate. The master sends an acknowledgement packet 28.

Once the reconnection is established at step 30, the master 2 and slave 8 continue to communicate at the reduced data rate, i.e. using the coding gain applied to the successfully received packet 26. However, as will be explained below with reference to FIG. 3, the data rate which is used at the beginning of a connection need not be maintained for the whole connection.

Figure 3:
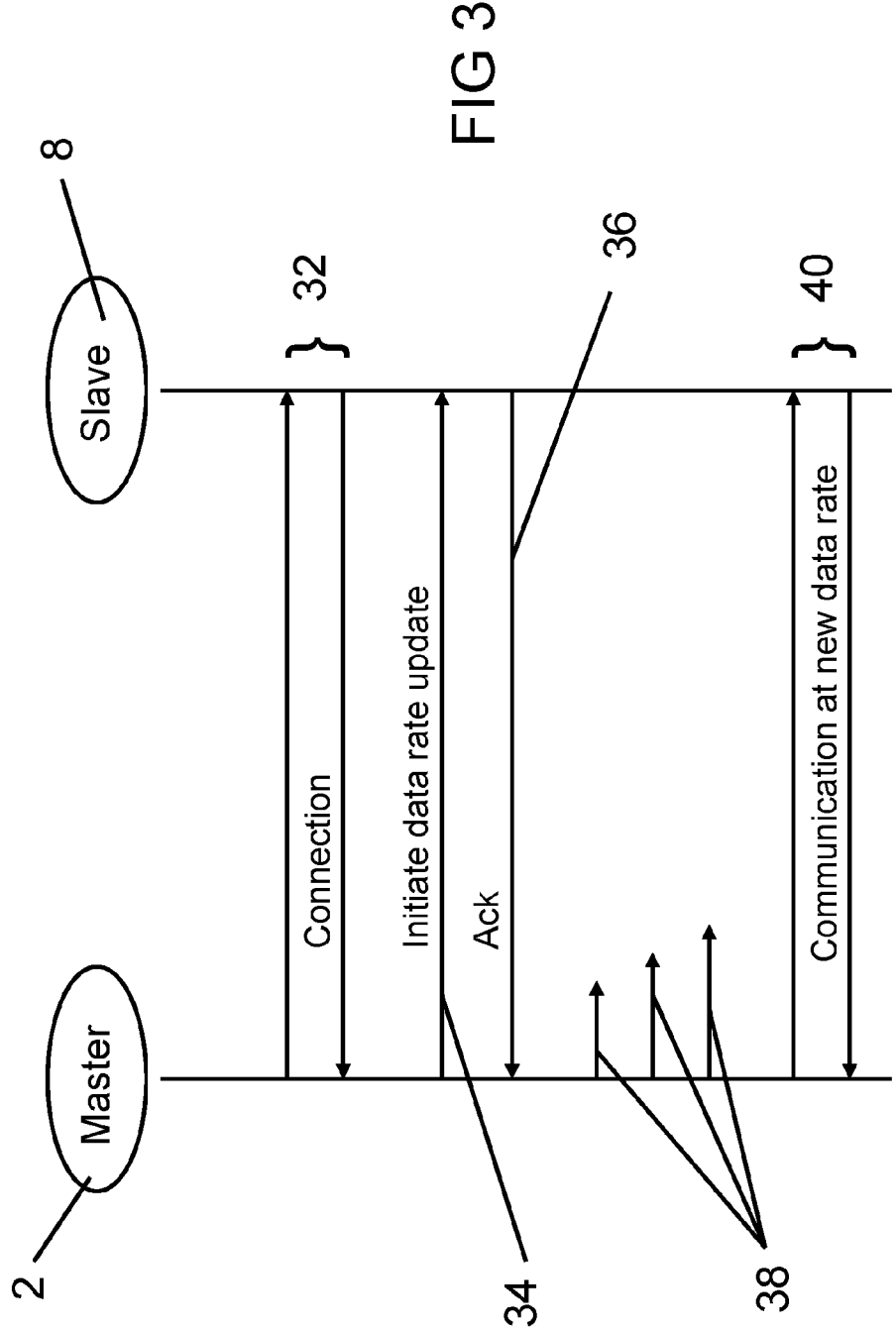
FIG. 3 is a schematic illustration of a process to change the data rate during a connection.

In FIG. 3 the master 2 and slave 8 begin in a connected state 32. Following a regular check carried out by the master 2, it determines that the received signal strength of the signal from the slave 8 is above a threshold, typically because the distance between the master and slave devices has been reduced. In order to take advantage of the increased signal strength, the master 2 sends a special packet 34 to initiate an increase of the data rate. The packet 34 initiates a control procedure to bring this about and includes a field which specifies the new data rate to be applied. For example it may specify a shorter sequence length corresponding to a lower coding gain and so a higher data rate. The master 2 may be aware of which data rates the slave 8 can support from a previous exchange of capability information—e.g. during the third phase of a Bonding procedure previously carried out—in which case further negotiation is not necessary. Otherwise the master 2 may look for confirmation from the slave 8 that it supports the proposed new rate (assuming it is still different from the standard protocol rate—e.g. 1 MBps for Bluetooth Low Energy).

After a certain number of events 38 (which number may be specified in the initiating packet 34) the master 2 and slave 8 begin at step 40 to communicate at the new data rate. This means that the devices each apply the new sequence length to all or part of their transmitted packets and configure their receive demodulators to be responsive to the new sequence length for received packets.

The procedure set out above may be repeated any number of times during the connection—either to further relax the coding gain if the signal strength continues to increase or to increase it again if the devices move apart and the signal strength drops.

Although the procedure described above is based on received signal strength, this is not essential. It could, for example, be based on a threshold bit error rate or other parameter related to the separation of the devices or the quality of the connection.

Figure 4:
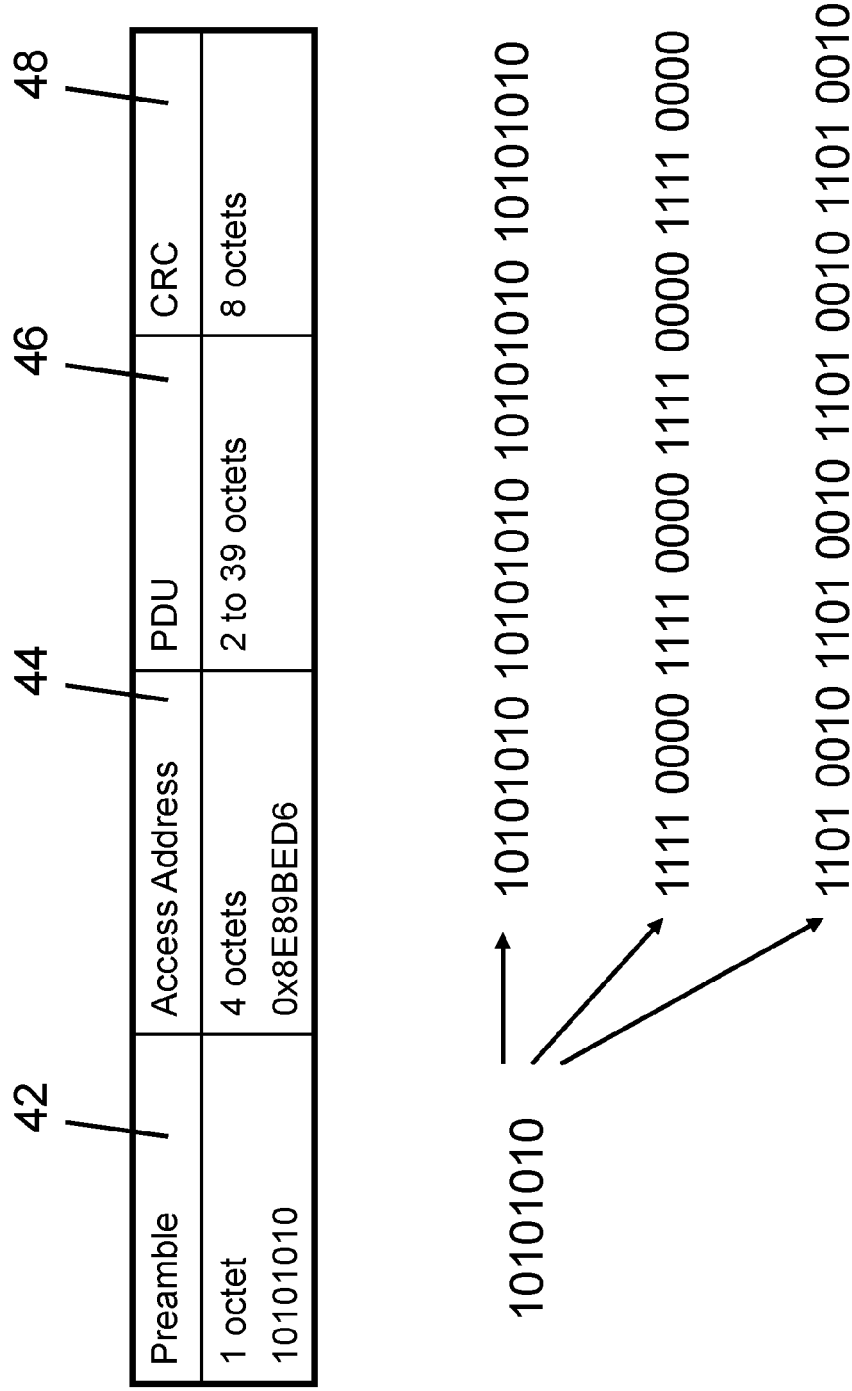
FIG. 4 is a representation of a packet structure and possible coding schemes which may be applied.

FIG. 4 shows a typical packet construction. The packet is divided into four separate fields of differing lengths. The first is the Preamble 42. This is made up of a single octet of alternating bits which may be used by the receiver for frequency recovery, timing recovery etc. Below the table are some examples of how a four times coding gain could be applied to the preamble '10101010'. In the top example the original sequence is simply repeated four times. Thus a bit at position n in the original string is represented by four bits (or 'chips') in the extended sequence—namely those at positions n, n+8, n+16 and n+24 of the extended string. Assuming a consistent 'over-the-air' transmission rate, the effect of this coding scheme is that the data rate is reduced to a quarter of its original value. Equivalently it may be said that there is a four times coding gain.

In the centre example each bit is repeated four times. Again, clearly each bit in the original string is represented by four chips in the extended string.

In the bottom example a direct-sequence spread spectrum is used. In this example each '1' bit is represented by the sequence '1101' and each '0' bit is represented by '0010'. Of course different sequences could be used, particularly different length sequences could be used depending on the required coding gain. The actual sequence to be used for each bit could be predetermined or, where applicable agreed during phase three of a Bonding process.

Although the preamble is used in FIG. 5 as a simple example of how coding gain might be applied, in an exemplary embodiment no coding gain is applied to the preamble in order that it can still be used for initialisation at the receiver.

The fields in the packet are the Access Address 44 which specifies the address of the device to which the packet is directed, the Protocol Data Unit (PDU) 46 which is the actual content of the message carried by the packet and the Cyclic Redundancy Check (CRC) 48 which is a field generated by a predetermined formula from the PDU 46 for use in error checking.

In an example implementation the Access Address 44, PDU 46 and CRC 48 are all encoded using DSSS. The CRC 38 is calculated from the PDU 46 before the DSSS coding is applied.

The invention claimed is:

1. A method of digital radio communication between a first device and a second device, each comprising a radio transmitter and a radio receiver, the method comprising:
   a) said first and second devices establishing a connection using a predetermined protocol having at least one predefined message format;
   b) if said connection is subsequently broken, said second device transmitting an advertising message at a first data rate indicating a desire to reconnect;
   c) if a reconnection is not established, said second device transmitting a further advertising message at a second data rate indicating a desire to reconnect, wherein said second data rate is lower than the first data rate; and
   d) the first and second devices conducting subsequent communication at a data rate applied to the advertisement message received by the first device in order to establish the reconnection.

2. A method as claimed in claim 1 wherein the first device comprises a master device and the second device comprises a slave device.

3. A method as claimed in claim 1 wherein the lower data rate results from at least part of said further advertising message being encoded using a coding scheme in which at least some bits specified in said predefined message format are represented by a plurality of bits transmitted.

4. A method as claimed claim 3 wherein said coding scheme comprises a respective fixed sequence of chips to represent each data bit.

5. A method as claimed in claim 1 comprising the first and second devices agreeing during a connection that the second device will transmit said further advertising message if necessary to establish the reconnection.

6. A method as claimed in claim 1 comprising the second device transmitting a plurality of advertising messages at the first data rate.

7. A method as claimed in claim 1 further comprising said second device transmitting a further advertising message at the first data rate indicating a desire to reconnect.

8. A method as claimed in claim 1 comprising d) if a reconnection is not established at said second data rate, said second device transmitting a further advertising message at a third data rate indicating a desire to reconnect, wherein said third data rate is lower than the second data rate.

9. A method as claimed in claim 1 comprising said second device cycling through a plurality of available data rates for advertisement messages.

10. A method as claimed in claim 1 comprising the first device listening for messages at both said first and second data rates.

11. A method as claimed in claim 1 comprising changing said data rate if a criterion is met.

12. A method as claimed in claim 11 wherein the criterion comprises a measure of a quality of signal between the first and second devices.

13. A method as claimed in claim 11 wherein said criterion comprises an estimate of the received signal strength from one of the devices to the other device.

14. A method as claimed in claim 1 comprising changing the data rate if the received signal strength of one device is determined to be above or below a threshold level.

15. A method as claimed in claim 1 wherein the predetermined protocol is compatible with a Bluetooth™ or Bluetooth Low Energy™ protocol.

16. A method as claimed in claim 15 wherein the advertising message and the further advertising message form part of one or more Advertising events in accordance with a Bluetooth™ protocol.

17. A digital radio device comprising a radio transmitter and a radio receiver, the device being arranged:
   a) to establish a connection with another device using a predetermined protocol having at least one predefined message format;
   b) if said connection is subsequently broken, to transmit an advertising message at a first data rate indicating a desire to reconnect;
   c) if a reconnection is not established, to transmit a further advertising message at a second data rate indicating a desire to reconnect, wherein said second data rate is lower than the first data rate; and
   d) arranged to conduct subsequent communication with the other device at a data rate applied to the advertisement message received by the other device in order to establish the reconnection.

18. A device as claimed in claim 17 wherein the lower data rate results from at least part of said further advertising message being encoded using a coding scheme in which at least some bits specified in said predefined message format are represented by a plurality of bits transmitted.

19. A device as claimed claim 18 wherein said coding scheme comprises a respective fixed sequence of chips to represent each data bit.

20. A device as claimed in claim 17 arranged to agree with the other device during a connection to transmit said further advertising message if necessary to establish the reconnection.

21. A device as claimed in claim 17 arranged to transmit a plurality of advertising messages at the first data rate.

22. A device as claimed in claim 17 arranged to transmit a further advertising message at the first data rate indicating a desire to reconnect.

23. A device as claimed in claim 17 arranged d) if a reconnection is not established at said second data rate, to transmit a further advertising message at a third data rate indicating a desire to reconnect, wherein said third data rate is lower than the second data rate.

24. A device as claimed in claim 17 arranged to cycle through a plurality of available data rates for advertisement messages.

25. A device as claimed in claim 17 arranged to change said data rate if a criterion is met.

26. A device as claimed in claim 25 wherein the criterion comprises a measure of a quality of signal between from the other device.

27. A method as claimed in claim 25 wherein said criterion comprises an estimate of the received signal strength from the other device.

28. A device as claimed in claim 17 arranged to change the data rate if the received signal strength from the other device is determined to be above or below a threshold level.

29. A device as claimed in claim 17 wherein the predetermined protocol is compatible with a Bluetooth™ or Bluetooth Low Energy™ protocol.

30. A device as claimed in claim 29 wherein the advertising message and the further advertising message form part of one or more Advertising events in accordance with a Bluetooth™ specification.

31. A digital radio communication system comprising a first device and a second device, each comprising a radio transmitter and a radio receiver, wherein:
   a) said first and second devices are arranged to establish a connection using a predetermined protocol having at least one predefined message format;
   b) if said connection is subsequently broken, said second device is arranged to transmit an advertising message at a first data rate indicating a desire to reconnect;
   c) if a reconnection is not established, said second device is arranged to transmit a further advertising message at a second data rate indicating a desire to reconnect, wherein said second data rate is lower than the first data rate; and
   d) said second device is arranged to conduct subsequent communications at a data rate applied to the advertisement message received by the first device in order to establish the reconnection.

32. A digital radio communication system as claimed in claim 31 wherein one or both of said first and second devices are arranged:
   a) to establish a connection with another device using a predetermined protocol having at least one predefined message format;
   b) if said connection is subsequently broken, to transmit an advertising message at a first data rate indicating a desire to reconnect;
   c) if a reconnection is not established, to transmit a further advertising message at a second data rate indicating a desire to reconnect, wherein said second data rate is lower than the first data rate; and
   d) to conduct subsequent communication with the other device at a data rate applied to the advertisement message received by the other device in order to establish the reconnection.

* * * * *